March 5, 1940.  E. K. SCOGGIN  2,192,859
STOKER CONTROL SYSTEM
Filed Jan. 8, 1938
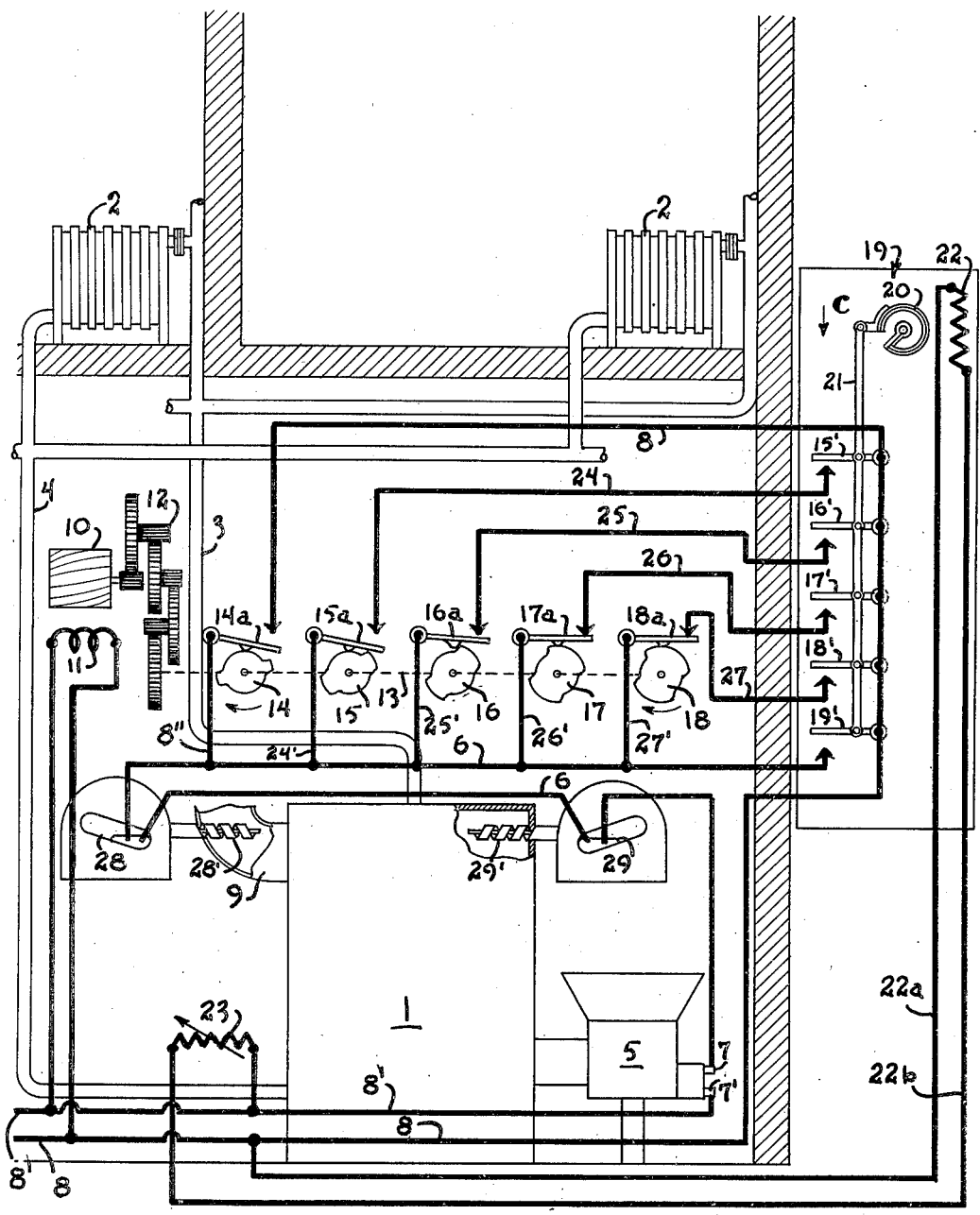
INVENTOR
Elmer K. Scoggin
BY
George H Fisher
ATTORNEY

Patented Mar. 5, 1940

2,192,859

UNITED STATES PATENT OFFICE

2,192,859

STOKER CONTROL SYSTEM

Elmer K. Scoggin, Minneapolis, Minn., assignor to Minneapolis-Honeywell Regulator Company, Minneapolis, Minn., a corporation of Delaware Application January 8, 1938, Serial No. 183,929

4 Claims. (Cl. 236—46)

The present invention relates to automatic timed controls for periodically operating automatic stokers for furnaces and the like and is concerned more particularly with apparatus for regulating the duration of stoking periods in accordance with outside temperatures.

The invention is intended primarily for use with stokers of the type employed for feeding a solid fuel such as coal or the like to a furnace or boiler. Such automatic stokers do not provide for variable rates of fuel feeding or delivery and to govern the rate of combustion as desired to meet heating load demands it is necessary to operate the stoker intermittently, periodically turning on and off the motor driving means for the stoker.

The stoking operations may be governed in accordance with temperatures of the space being heated but a situation is very often encountered in the case of multiple family dwellings wherein it is impossible or not feasible to locate a thermostat in the dwelling at any particular point and secure satisfactory heating results. Such dwellings constructed to accommodate two or more families are difficult to maintain at satisfactory comfort temperatures in all parts and offer no suitable place to locate a thermostat controlling the stoker whereby all parts of the structure will be properly served with heated fluid from the furnace. Furthermore, different families may desire different degrees of heat and may desire to reset the controlling means manually at times. Obviously, a single interior thermostat falls short of satisfying the requirements and demands of all the occupants of the dwelling.

My invention contemplates eliminating the above mentioned difficulties and problems by automatically regulating the stoking operations in response to outdoor temperatures and varying the duration of the "on" and "off" periods of the stoking apparatus as the outside temperature varies. A single device responsive to outdoor temperatures may be suitably located to provide satisfactory heating for all parts of a multiple family dwelling, commonly referred to as a duplex, four-plex, etc. Thus the undesirable features involved in the use of a single indoor thermostat are avoided and particularly in structures wherein the amount of fuel consumed would not warrant it, the adoption of such expedients as "zoning" the structure or similar installations are made unnecessary.

Among the objects of my invention are:

To provide an apparatus for automatically controlling a stoker in a multiple family dwelling in response to outdoor temperatures.

To provide a device as part of a stoker control apparatus for automatically causing the stoker to operate at intervals of relatively short duration, which device is operable at all times independently of outdoor or indoor temperatures to maintain a fire in the furnace.

To provide a compact and unitary control apparatus for both regulating a stoker to meet variable heating loads and to operate said stoker to maintain a fire under no heating load conditions, said apparatus being responsive to a single outdoor thermostat adapting it for use in multiple family dwellings.

To provide simple means to be located in the basement of a multiple family dwelling for adjusting the effect of an outdoor thermostat to produce different rates of heating.

To provide simple means for positively acting to operate a stoker in accordance with outdoor temperatures and maintain a minimum rate of fuel delivery continuously except in the event the fire is accidentally extinguished or the boiler water temperature becomes unsafely high.

The figure represents more or less diagrammatically a heating system having an automatic stoker and my control arrangement applied thereto.

The drawing shows diagrammatically a portion of a building having a furnace 1 in the basement. The furnace forms a part of a conventional heating system shown for purposes of illustration as a hot water or steam heating system including a boiler heated by the furnace and radiators 2 in different rooms of the building. The furnace 1 has a flue or pipe 9 for providing draft and for conveying away the burnt gases of combustion. The radiators 2 may be connected to the boiler through a vertical riser 3 and a return pipe 4 for conveying cooling fluid back to the boiler. Numeral 5 indicates an automatic electrically operated stoker of conventional type for feeding a solid fuel such as coal to the furnace. The automatic stoker 5 includes an electric motor for operating it, the electric motor having terminals 7 and 7'. Electric energy is supplied to the stoker motor and control system for the motor by means of line wires 8 and 8' leading from some source of power, not shown. The terminal 7' is connected to the line wire 8'. Although one form of heating system has been shown for purposes of illustration, other forms may be utilized within the contemplation of the invention.

The automatic control system for the stoker motor includes an outdoor temperature responsive device located within an enclosure 19 which is outside of the building. The control system is governed primarily in response to this outdoor thermostatic device. The thermostatic device comprises a bimetallic element 20 of generally circular conformation of conventional type which need not be described in detail. Located within the enclosure 19 at any convenient point which may or may not be adjacent the thermostatic element 20 is a heating resistance 22, this heating resistance being connected by conductor 22a to the line wire 8 and by conductor 22b through variable resistance 23 to the line wire 8'. Thus heating resistance 22 is in series with variable resistance 23 and is connected across the line 8—8'. Resistance 22 provides a certain amount of heating within the enclosure 19 which is determined by the setting of variable resistance 23. The construction and design of the resistances is such that the temperature within enclosure 19 is always maintained under normal conditions at a substantially constant number of degrees above outdoor temperature. In other words, under normal conditions there is always a substantially constant differential between the temperatures within and without the enclosure 19. Obviously the thermostatic element 20 can be made to respond by adjusting the variable resistance 23.

One of the major purposes of resistance 22 is to provide compensation for weather conditions including variation in wind velocity, the amount of solar radiation, etc. It is of course well known to heating engineers that when the outdoor temperature does not necessarily change but when the wind velocity varies or conditions involving the magnitude or degree of solar radiation and the like change, the amount of heat supplied to a building to maintain a desired temperature will vary. As the resistance 22 normally maintains the interior of the enclosure 19 at a higher temperature than the exterior there is always a path of heat flow from the interior to the exterior. Resistance 22 continually dissipates heat to the exterior of the enclosure 19 and the rate of this heat dissipation will vary in accordance with wind velocities, solar radiation and the like affecting the enclosure 19 exterior of the building. Thus by raising of the rate of heat dissipation from within the enclosure 19 due to these conditions the temperature within the enclosure may vary even though general atmospheric temperatures do not change. It is thus readily seen that the resistance 22 provides for compensation of the control apparatus for weather conditions including variations in wind velocity, solar radiation, etc. The resistance 22 and variable resistance 23 further provide a device for calibrating the control apparatus. This function of the resistances will be described later.

Thermostatic element 20 has a movable arm as shown which is connected to a relatively long link 21. Pivotally connected to the link 21 are a plurality of switch arms 15' to 19'. These switch arms are arranged in parallelism and are all pivoted at one end, as shown, so as to be reciprocated for opening and closing movement of the switches which they form part of by movements of the link 21. Each of the switch arms 15' to 19' is associated with an electrical contact, as shown, to form switches. When all of the switches are open the switch arms ranging from 15' to 19' are progressively farther from their associated contacts in the order as shown. Thus downward reciprocating movement of the link 21 will close the switch formed by arm 15' first and the remaining switches formed by switch arms 16' to 19' will close sequentially. Thus for example, the switch represented by numeral 15' may be arranged to be closed by the thermostatic element 20 at a temperature of 60° within the enclosure 19 and the remaining switches represented by numerals 16' to 19' may be arranged to close at progressively lower temperatures ranging, for example, from 40° to —10° at switch arm 19'. Referring again to the resistances 22 and 23, it is readily seen that the operating temperatures of all the switches with respect to outdoor temperature can be varied proportionately by adjusting resistance 23 and this variation in operating temperatures can be made regardless of outdoor temperatures. Adjusting resistance 23 of course varies the heating at resistance 22 and consequently the temperature within the enclosure 19 and the responses of the thermostatic element 20. Adjustment of resistance 23 operates to change the temperature differential between the inside and outside of enclosure 19. Accordingly, the rate of heat dissipation from enclosure 19 can be made to correspond substantially to the heat losses from the particular building being heated. Thus an accurate calibration of the operating temperatures of the switches represented by numerals 15' to 19' can be made by adjusting the variable resistance 23 so that the correct thermostatic switch will be closed to produce the proper amount of heating as determined by outdoor conditions.

Each of the fixed contacts of switches 15' to 18' is connected to the fixed contact of corresponding switches numbered from 15a to 18a by conductors 24 to 27, respectively. As shown, the pivoted ends of the switch arms 15' to 19' are connected in common to a continuation of the line wire 8, a further continuation of which forms a fixed contact for a switch numbered 14a. The fixed contact of the switch 19' is connected by conductor 6 through two mercury type switches 28 and 29 to the terminal 7 of the automatic stoker 5. The pivoted end of the switch arm 14a is connected to the conductor 6 by conductor 8" and the pivoted end of each of the switch arms 15a to 18a is connected to the conductor 6 by conductors 24' to 27', respectively, as shown. Obviously the conductors indicated by the numerals 24 to 27 provide for completion of various electrical circuits from line wire 8 through the switches indicated by numerals 15 to 18 through the conductor 6 which goes through the mercury switches to the terminal 7 of the stoker 5. Switch 14a provides for completion of a circuit from conductor 8 through conductor 8" and the mercury switches to the stoker. Switch 19 provides for completion of an electrical circuit directly from line wire 8 to conductor 6 and thence through the mercury switches.

The mercury switches 28 and 29 are of a conventional type and are arranged to open the circuit to terminal 7 of the stoker in response to thermostatic elements 28' and 29', respectively. Numeral 28' represents a thermostatic element located in the flue or pipe of the furnace and operates to open switch 28 and break the circuit to the stoker whenever the temperature of the gases in the pipe falls to a low value indicating that the fire in the furnace has gone out. Thus in the event of accidental extinguishment of the fire the stoker will be prevented from feeding raw fuel into the combustion chamber. The thermostatic element 29' is arranged to be responsive to the temperature of the boiler water and operates to open switch 29 and break the circuit to the stoker in the event of an unduly high temperature of the boiler water. Thus the danger of explosion or rupture of the boiler or circulating system by reason of excessively high pressures therein is avoided.

The switches 14a to 18a are automatically operated and are arranged to be held closed so as to complete a circuit to the stoker for variable periods of time depending upon the outside temperature. Associated with each of the switches 14a to 18a is an operating cam correspondingly numbered, as shown, and all of the cams are driven by the same shaft diagrammatically indicated by the broken line 13. For driving the shaft 13 a motor generally indicated at 10 is provided. This motor is preferably a synchronous electrical motor having a winding 11 which is connected across the line represented by the line wires 8 and 8'. It is to be understood that various other types of motors such as mechanical or clock driven motors may be substituted for the electrical motor 10. The motor 10 drives the shaft 13 through a gear train generally indicated at 12 and is arranged so that the shaft 13 makes one revolution in a fixed period of time, for example, one hour. As shown, each of the cams 14 to 18 have two dwells or raised portions, the length or angular dimensions of the dwells or raised portions of the cams being progressively greater from cam 14 to cam 18. As the cams rotate the raised portions or dwells lift the switch arms thereby closing the switches and maintaining them closed for a period of time depending upon the extent of the dwell on the cam. Obviously any one cam will provide during each revolution for two operating periods of the stoker, the length of each depending upon the extent of the dwell on that particular cam and providing that the thermostatic switch corresponding with that particular cam switch is closed. The cam 14 has dwells of comparatively short extent and the switch 14a associated with this cam is not in circuit with any thermostatic switch, but its fixed contact, as shown, connects directly, or, that is, is formed as a continuation of the line wire 8. As shown on the figure, the switches associated with cams having dwells of longer extent are in circuit with the thermostatic switches which close at relatively lower temperatures. Thus at relatively lower outdoor temperatures the thermostatic switches provide for completion of circuits through cam operated switches which are associated with cams arranged for correspondingly longer duration of closed periods of the circuit to the stoker. Switch 14a provides for completion of a circuit to the stoker for two periods of relatively short duration during each revolution of cam 14 regardless of outdoor temperature. This circuit is from line wire 8 through switch 14a whenever that switch is closed, conductor 8'', and through the conductor 6 to the terminal 7 of the motor whenever switches 28 and 29 are in a closed position. This switch provides for short firing periods just long enough to keep the fire in the furnace from going out whenever all the thermostatic switches are open indicating that the outdoor temperature is high enough so that no heating is required of the system. Switch 19' is the lowermost of the thermostatic switches and is the last to close, that is, it closes at the lowest outdoor temperature which is expected to be encountered. This switch is not in circuit with any of the cam operated switches and completes a circuit to the stoker motor from line wire 8 through conductor 6 and the switches 28 and 29 whenever they are in closed position to the terminal 7 in the stoker. Thus closing of the switch 19' provides for continuous operation of the stoker for maximum firing whenever the circuit is not broken by either of the switches 28 or 29 which are commonly referred to as limit controls.

From the above structural description it is thought that the operation of my invention will be obvious to those skilled in the art. The system is entirely automatic in operation throughout any range of outdoor temperatures and having once been adjusted and calibrated at the time of installation it will thereafter always provide the proper degree of temperature in the building being served by the heating system. For example, if the outdoor temperature is above a certain upper limit of 60°, all of the thermostatic switches will be open as at this outdoor temperature no heating is necessary in the rooms of the building. However, the motor 10 is continuously operated and the cam operated switches will be opening and closing in their regular sequence during each revolution of the shaft 13. Switch 14a not being in circuit with any thermostatic switch will be causing the stoker to operate for two relatively short intervals during each hour or other timed revolution of shaft 13. The extent of the dwells on cam 14 is arranged to provide just enough operation of the stoker for firing to keep the fire in the furnace from going out and provides no heating in the system. If the outdoor temperature should fall to a lower value, for example 60°, switch 15' being set for this temperature will close thereby completing a circuit as above described from line conductor 8 through conductor 24, switch 15a, conductor 24', conductor 6, and switches 28 and 29 to the terminal 7 of the stoker motor. The extent of the dwells on cam 15 is great enough to provide two operating periods of the stoker motor during each hour or timed revolution of the shaft 13 of such a duration that the system will provide enough heat to maintain the desired indoor temperature at this outdoor temperature of 60°. As the outdoor temperature falls switches 16' to 18' close sequentially completing circuits through the switches 16a to 18a corresponding to the above described circuit to 15a. As the temperature falls, obviously circuits are completed through the switches associated with cams having the longer dwells thus providing for a greater amount of heating. As above described, the switch 19' is the last to close and provides for continuous firing and maximum heating capacity of the system by connecting line wire 8 to the stoker without passing through a cam operated switch. The switches 15a to 18a provide for various proportional parts of the maximum heating capacity; for example, the cam 18 may have its dwells arranged for 80% of maximum firing, that is, the two dwells may be arranged to keep the switch 18a closed during 80% of the rotation of the cam. The cams 15a to 17a may be arranged for proportionally lower percentages of maximum heating as for example 20, 40 and 60% respectively. The cam 14 being on the same shaft as the remaining cams and being driven by the same power source forms an integral part of the unitary device for both regulating the heating, as required by outdoor temperatures, and for maintaining the fire in the furnace when no heating is required. Thus the necessity of providing an additional device for maintaining the fire when no heating is required which ordinarily requires separate attention and adjustment is obviated. In addition, no separate devices or mechanisms requiring separate installation and servicing are needed for maximum heating in the system. The switch 19' forms an integral part of the unitary outdoor thermostatic device and operates to cause maximum firing when needed without the utilization of separate instruments, installation, or servicing. The provision of unitary devices for providing all the functions ordinarily needed in a heating system greatly reduces the initial cost of installation, changes, and servicing of heating equipment over systems used in the past wherein a considerable number of individually manufactured and installed control devices were used necessitating separate wiring connections, mounting, and servicing.

The variable resistance 23 for adjusting the amount of heating at resistance 22 in practice is ordinarily located in the basement of a building. Adjustment of the resistance 23 to calibrate the outdoor thermostatic device is ordinarily made at the time of installation and will need no further adjustment. However, if at any time it is found that the system is not producing the proper amount of heating the resistance 23 may be easily adjusted to calibrate the outdoor control device to secure the proper degree of heat. Being located in the basement the variable resistance 23 provides a convenient adjustment for anyone in the building, particularly in a multiple family dwelling where from two to four or more families may reside, and at the same time operates to compensate for outdoor wind, solar radiation conditions and the like.

The entire control system forms a unitary apparatus in which all the functions and control elements ordinarily required in a heating system are incorporated. The necessity of providing any controls or adjustments within the rooms themselves is avoided. The present system therefore meets the requirements of a heating control apparatus in a novel and highly useful manner, particularly as respects a multiple family dwelling or the like wherein indoor room controls are not feasible or practicable.

While the invention has been described in connection with one particular application, it is to be understood that it may be carried out with other types of combustion devices and in connection with installations having widely different constructions all without departing from the spirit and scope of the invention.

I claim as my invention:

1. In a heating system, in combination, means forming a combustion chamber adapted to contain solid fuel, an automatic stoker for feeding solid fuel into the combustion chamber, control apparatus for the stoker comprising timing means, means driven by said timing means including a plurality of cams having automatic switches controlling said stoker operated by the cams, said cams having contours arranged for keeping their associated switches closed for periods of different duration, one of said cams having a contour arranged for keeping its associated switch closed for periods of relatively short duration, automatic means responsive to outdoor temperature for selectively placing said automatic cam operated switches in control of said stoker depending on the outdoor temperature, said one cam and associated switch being operable to intermittently operate said stoker sufficiently to maintain a fire in said combustion chamber independently of temperature whereby the operation of the control apparatus is fully automatic in regulating the stoker to maintain a fire when no heating is desired and to regulate the stoker in accordance with the heating load when heating is necessary.

2. In a heating system, in combination, means forming a combustion chamber adapted to contain solid fuel, an automatic stoker for feeding solid fuel into the combustion chamber, control apparatus for the stoker comprising timing means, means driven by said timing means including a plurality of cams having automatic switches controlling said stoker operated by the cams, said cams having contours arranged for keeping their associated switches closed for periods of different duration, one of said cams having a contour arranged for keeping its associated switch closed for periods of relatively short duration, automatic means responsive to outdoor temperature for selectively placing said automatic cam operated switches in control of said stoker depending on the outdoor temperature, and means indicative of the absence of combustion in said combustion chamber for terminating operation of the stoker and preventing automatic resumption of operation thereof, said one cam and associated switch being operable to intermittently operate said stoker sufficiently to maintain a fire in said combustion chamber independently of temperature except when stoker operation is prevented by said means indicative of the absence of combustion in the combustion chamber.

3. In a heating system, in combination, means forming a combustion chamber adapted to contain solid fuel, an automatic stoker for feeding solid fuel into the combustion chamber, control apparatus for the stoker comprising timing means, means driven by said timing means including a plurality of cams having automatic switches controlling said stoker operated by the cams, said cams having contours arranged for keeping their associated switches closed for periods of different duration, one of said cams having a contour arranged for keeping its associated switch closed for periods of relatively short duration, automatic means responsive to outdoor temperature for selectively placing said automatic cam operated switches in control of said stoker depending on the outdoor temperature, said outdoor temperature responsive means including a temperature responsive element, an enclosure for said element and a heat source within said enclosure whereby variations in the rate of heat dissipation from said enclosure automatically compensate for heat losses due to wind and solar radiation conditions, said one cam and associated switch being operable to intermittently operate said stoker sufficiently to maintain a fire in said combustion chamber independently of temperature whereby the operation of the apparatus is fully automatic to maintain a fire when no heating is required and to properly regulate the stoker in accordance with the heating load when heating is necessary.

4. In a heating system, in combination, means forming a combustion chamber adapted to contain solid fuel, an automatic stoker for feeding solid fuel into the combustion chamber, control apparatus for the stoker comprising timing means, means driven by said timing means including a plurality of cams having automatic switches controlling said stoker operated by the cams, said cams having contours arranged for keeping their associated switches closed for periods of different duration, one of said cams having a contour arranged for keeping its associated switch closed for periods of relatively short duration, automatic means responsive to outdoor temperature for selectively placing said automatic cam operated switches in control of said stoker depending on the outdoor temperature, said outdoor temperature responsive means including a temperature responsive element, an enclosure for said element and a heat source within said enclosure whereby variations in the rate of heat dissipation from said enclosure automatically compensate for heat losses due to wind and solar radiation conditions, and means indicative of the absence of combustion in said combustion chamber for terminating operation of the stoker and preventing automatic resumption of operation thereof, said one cam and associated switch being operable to intermittently operate said stoker sufficiently to maintain a fire in said combustion chamber independently of temperature except when stoker operation is prevented by said means indicative of the absence of combustion in the combustion chamber.

ELMER K. SCOGGIN.